United States Patent [19]
Lindmark

[11] Patent Number: 5,734,250
[45] Date of Patent: Mar. 31, 1998

[54] METHOD AND ARRANGEMENT FOR CONTROLLING AN INDUCTION MOTOR

[75] Inventor: Magnus Carl Wilhelm Lindmark, Stockholm, Sweden

[73] Assignee: Aktiebolaget Electrolux, Stockholm, Sweden

[21] Appl. No.: 545,643

[22] PCT Filed: Feb. 24, 1995

[86] PCT No.: PCT/SE95/00201

§ 371 Date: Oct. 30, 1995

§ 102(e) Date: Oct. 30, 1995

[87] PCT Pub. No.: WO95/24073

PCT Pub. Date: Sep. 8, 1995

[30] Foreign Application Priority Data

Mar. 1, 1994 [SE] Sweden .................... 9400701

[51] Int. Cl.⁶ ............................................. H02P 5/34
[52] U.S. Cl. ................................... 318/801; 318/808
[58] Field of Search ............................. 318/798–811

[56] References Cited

U.S. PATENT DOCUMENTS

| | | | |
|---|---|---|---|
| 3,593,103 | 7/1971 | Chandler | 318/808 |
| 4,274,042 | 6/1981 | Walker et al. | 318/803 |
| 4,317,074 | 2/1982 | Erth | 318/808 |
| 4,334,182 | 6/1982 | Paul J. Landino | 318/808 |
| 4,437,050 | 3/1984 | Overzet | 318/798 |
| 4,442,394 | 4/1984 | Hans M. Beierholm et al. | 318/807 |
| 4,857,819 | 8/1989 | Maurice et al. | 318/778 |
| 5,045,988 | 9/1991 | Gritter et al. | 318/803 |
| 5,218,283 | 6/1993 | Wills et al. | 319/748 |
| 5,420,492 | 5/1995 | Sood et al. | 318/809 |

FOREIGN PATENT DOCUMENTS

| | | |
|---|---|---|
| 0 085 203 | 8/1983 | European Pat. Off. |
| 4110225 A1 | 10/1992 | Germany. |

*Primary Examiner*—David S. Martin
*Attorney, Agent, or Firm*—Pearne, Gordon, McCoy, & Granger LLP

[57] ABSTRACT

A device for controlling a three-phase induction motor that is driven by an inverter connection. The inverter is furnished to be fed with full-wave rectified grid alternating voltage (U) and supply the motor's various phases (R, S, T) with the drive voltages phase-displaced in the normal way and which consist of mainly square, in relation to a virtual zero reference level, positive and negative half-periods which alternate at a fixed or adjustable drive frequency corresponding to the required speed. The full-wave rectified grid alternating voltage (U) supplied to the inverter is arranged to be supplied to respective motor phase (R, S, T) via an electronic switch connection ($TR_{1H}$, $TR_{1L}$; $TR_{2H}$, $TR_{2L}$; $TR_{3H}$, $TR_{3L}$) whose respective on and off periods are determined by the drive frequency which is generated by an oscillator device (15; 25). The last mentioned is arranged to be supplied with a voltage ($U_m$) which directly or indirectly represents the rectified grid alternating voltage (U) for the purpose of modulating the drive frequency with a signal that represents the variations in amplitude of the rectified grid alternating voltage. The invention also comprises a method of controlling an induction motor of the type specified.

12 Claims, 5 Drawing Sheets

METHOD AND ARRANGEMENT FOR CONTROLLING AN INDUCTION MOTOR

BACKGROUND OF THE INVENTION

This invention refers to induction motors and concerns more exactly a method and arrangement for controlling a three-phase induction motor driven by an inverter coupling to be supplied with full-wave rectified mains alternating voltage and to provide the various phases of the motor with drive voltage consisting mainly of square shaped, in relation to a virtual zero reference level, positive and negative half periods that alternate with a fixed or adjustable drive frequency corresponding to the required speed.

The speed of induction motors is determined in the first instance by the frequency of the feed alternating voltage supplied. To drive such a motor at a higher speed than that which can be achieved using the ordinary mains frequency it is usual to employ an inverter coupling by means of which the motor can be frequency-controlled so that it can be run at the required speed. To achieve a large degree of simplicity in the motor's control device it is desirable to drive the motor using square voltage pulses. At power levels exceeding about 300 W, this results in inconvenience as the motor losses will be large and the motor sound level will be high. In inverter operation of induction motors for power levels higher than about 300 W, the inverter is therefore generally designed so that it gives off a voltage that is shaped like a sine wave. The frequency of the alternating voltage supplied is only changed if the speed is to be changed or to compensate for greater or lesser slippage. It is also common that the amplitude of the alternating voltage supplied is changed so that it increases with increasing frequency.

Inverters of the type described often become complicated and expensive to make, which results in inverter-controlled induction motors not being used in conjunction with domestic appliances of various types even if they would provide purely technical advantages.

Another problem with inverter-driven induction motors for powers above about 300 W is that they can give rise to considerable mains distortion. The reason for this is that a typical inverter coupling is fed with rectified and smoothed mains alternating voltage, which implies that, seen from the mains, current flows to the inverter only during a short period in the region round the mains alternating voltage peak value, when a reservoir condenser included in the coupling is charged. As the energy fed to the motor load is to be taken from the mains by current that flows only during short periods, current transients occur that give rise to the mains distortion mentioned above. At higher powers this distortion reaches unacceptable levels and various types of filter must therefore be provided, which further increases the expense of the device.

The invention is in the first instance envisaged for applications in conjunction with induction motors of small sizes and for very high speeds, exceeding 50,000 revolutions per minute, preferably in the speed range around 100,000 revolutions per minute. At these high speeds, the leakage inductance in the motor assumes a higher value due to the small physical dimensions of the motor. This leak inductance is in the first instance concentrated to the air gap between the rotor and stator. If the motor is now driven using square voltage, the leak inductance will affect the current so that it will more or less adopt a sine-wave form. The desired curve form of current can thus here be achieved without the supply voltage being sine shaped.

If, to obtain an inexpensive and simple inverter and also avoid the occurrence of mains distortion, such a motor is supplied with full-wave rectified unsmoothed mains alternating voltage, the higher drive frequency will be modulated by a frequency that is twice the mains alternating voltage frequency. Such a low-frequency modulation of the drive frequency results in the rotor, if it is braked by a load, changing its speed up and down with a frequency of 100 Hz (at a grid frequency of 50 Hz). If, for example, a rotor rotates at 90,000 revolutions per minute, the small mass of the rotor will result in a relatively great speed reduction of the rotor when the drive voltage is low. This fluctuation in speed causes the slippage of the rotor to increase, which will increase the motor losses.

SUMMARY OF THE INVENTION

An object of the invention is to provide a method of controlling inverter-driven induction motors and a device for controlling such motors by which the control device design will be simple and the motor be imparted acceptable efficiency so that such motor can be used in price-sensitive products such as household machines of the vacuum cleaner and washing machine type, for example.

Another object of the invention is to provide a control device which obviates the need to smoothen the full-wave rectified mains alternating voltage supplied to the inverter coupling, so that current can flow from the mains during the whole period of the mains alternating voltage and not only during short parts of it.

A further object is to provide a control device for an inverter-driven induction motor of small size fed with full-wave rectified unsmoothed mains alternating voltage and driven at very high speed, exceeding 50,000 revolutions per minute, preferably round 100,000 revolutions per minute, said control device gluing the motor a more constant and smaller slippage despite the variations in amplitude of the supplied unsmoothed mains alternating voltage.

Other objects and advantages of the invention will be apparent from the subsequent detailed description of a preferred embodiment, with reference to the following drawings in which.

DETAILED DESCRIPTION OF THE PREFERRED EMBODIMENT

Figure 1:
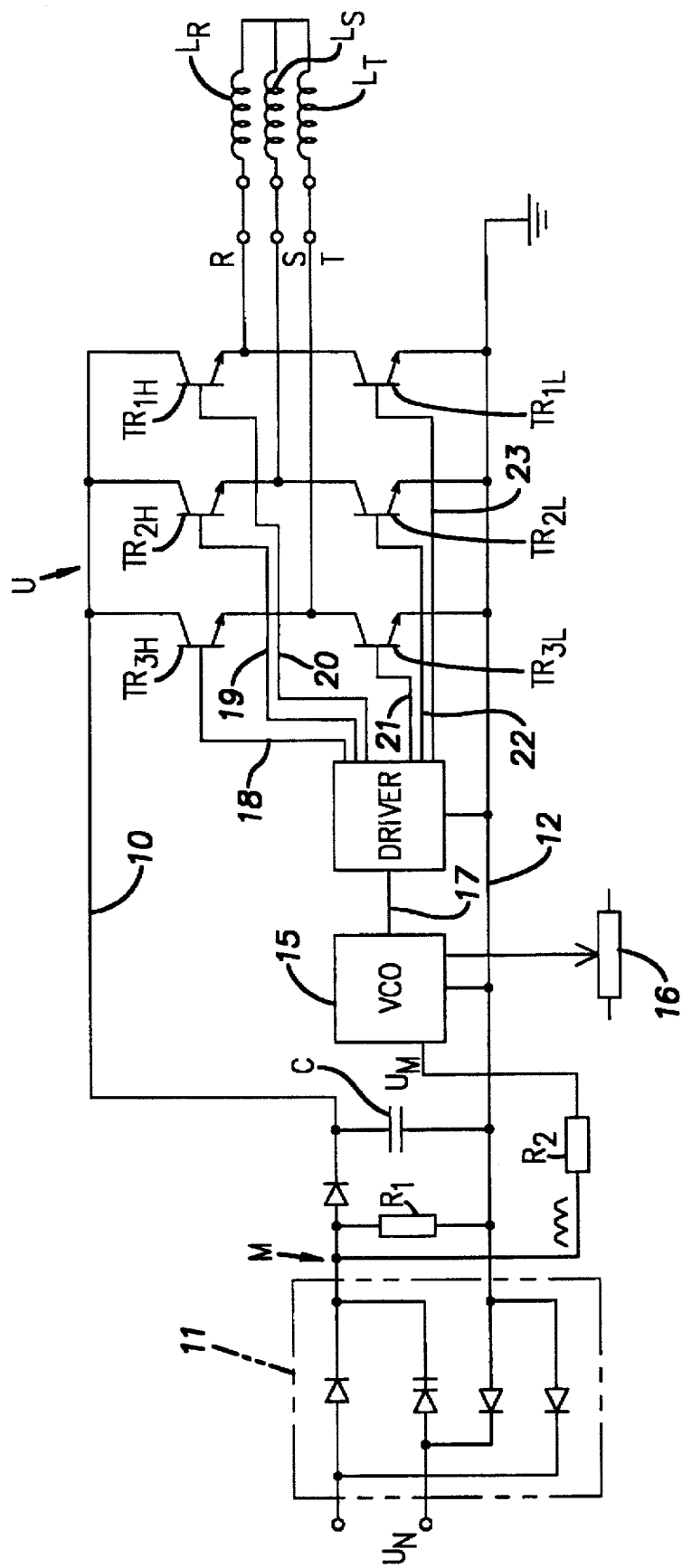
FIG. 1 is a schematic circuit diagram of a control device in accordance with the invention.

FIG. 1 shows the basic construction of a control device in accordance with the invention, with the necessary components specified in block form. A three-phase induction motor is shown to the right in the figure and is represented by three stator windings, $L_R$, $L_S$ and $L_T$. The windings are coupled together at one end and the free ends are connected to terminals R, S and T. These terminals are supplied with drive voltages that are displaced in time through 120 degrees in relation to one another in the normal way. The terminals R, S and T are connected to respective pairs of transistors $TR_{1H}$, $TR_{1L}$; $TR_{2H}$, $TR_{2L}$; $TR_{3H}$, $TR_{3L}$. The transistors in each pair are connected in series with each other and respective terminals R, S and T are connected to the connection point between the two transistors in each pair. The transistors have in this case been shown as bipolar transistors but can obviously be of another type, such as the MOSFET or IGBT type.

The collectors on transistors $TR_{1H}$, $TR_{2H}$ and $TR_{3H}$ are coupled together and connected to unsmoothed full-wave rectified mains alternating voltage (U) via a conductor (10). The conductor is supplied from a full-wave rectifier (11) of the usual type, whose opposite poles are connected to a conductor (12) which constitutes a common reference potential for the device (neutral, supply, or earth). The full-wave rectifier (11) has two poles (13, 14) connected to the mains alternating voltage ($U_N$) which, for example, has an effective value of 230 V and frequency 50 Hz. With these values, the full-wave rectified voltage (U) obtains an amplitude of 325 V. A capacitor (C) is connected between the conductors (10, 12) but is only intended to permit high-frequency interference signals to pass.

To drive transistors $TR_{1H}$, $TR_{1L}$; $TR_{2H}$, $TR_{2L}$; $TR_{3H}$, $TR_{3L}$, it is necessary to have three pairs of drive pulses or, in all, six square-shaped pulse trains which are in a suitable way mutually displaced in time. To generate these pulse trains, an oscillator (15) is arranged in the form of a voltage-controlled oscillator whose output frequency can be set at a value corresponding to the required speed of the motor. For this purpose a potentiometer (16) is used. The output signal from the voltage-controlled oscillator (15) is, via a conductor (17), transmitted to a drive circuit (33) which may be of the usual type (made as an integrated standard circuit) and generates six pulse trains which, via conductors (18, 19, 20, 21, 22 and 23) are transmitted to the bases of respective transistors $TR_{1H}$, $TR_{1L}$–$TR_{3H}$, $TR_{3L}$. As will be dealt with in greater detail in conjunction with the practical coupling shown in FIG. 2, a further voltage ($U_M$) is supplied to the voltage-controlled oscillator (15) and this voltage is derived from the full-wave rectified mains alternating voltage and is led via a resistor ($R_1$) to an input on the oscillator.

The voltage ($U_M$) is designed to provide a modulation of the oscillator frequency which is dependent on the amplitude variations in the full-wave rectified mains alternating voltage.

Figure 2:
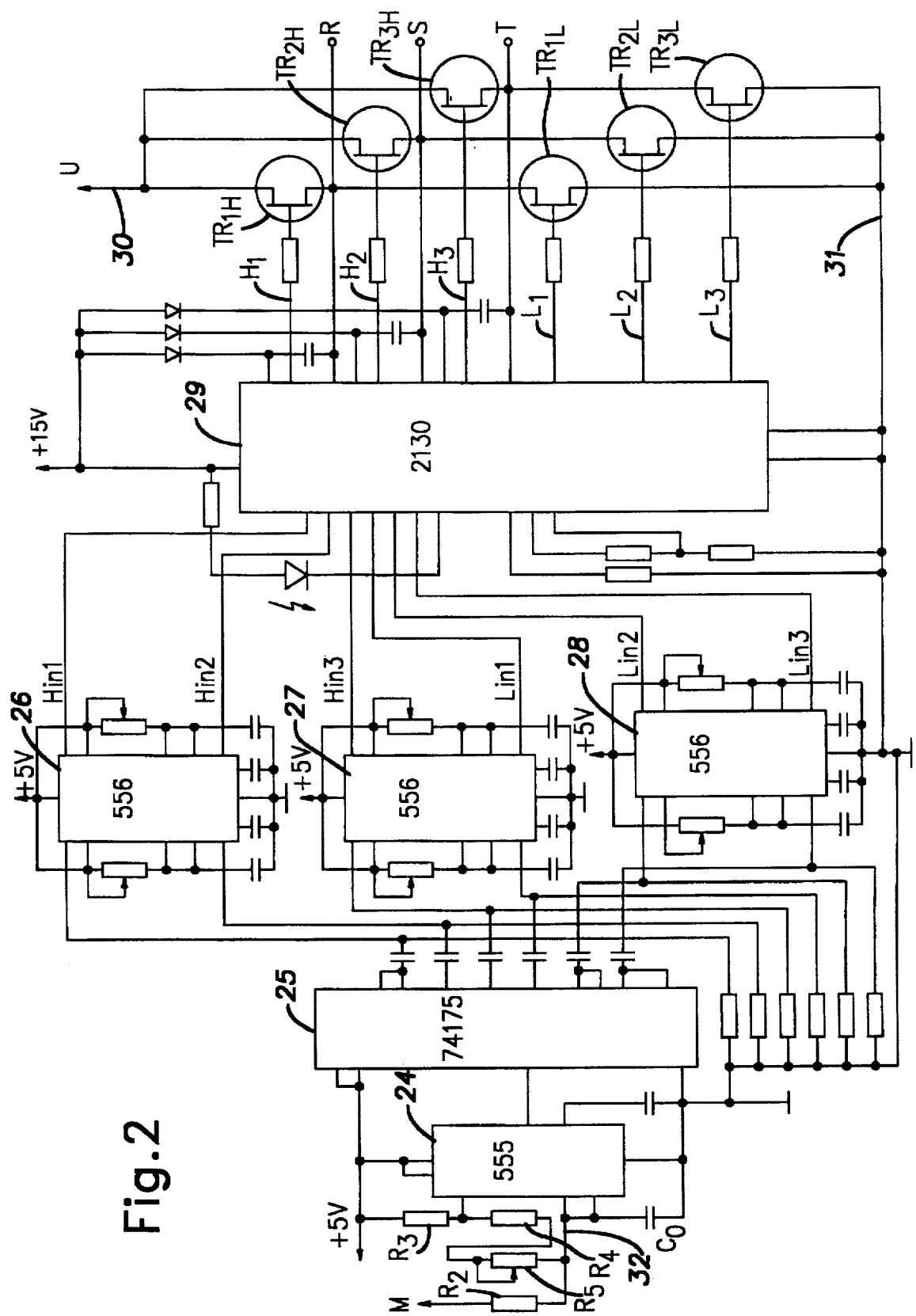
FIG. 2 is a detailed circuit diagram for a practical control device.

FIG. 2 shows a wiring diagram for a practical control device in accordance with the invention. The control device is an example of an inverter connection that generates a fixed or adjustable drive frequency that is supplied to a number of switch transistors for controlling their on and off times. The task of the switch transistors is, via connections R, S and T, to supply to the motor's stator windings a square shaped drive voltage that is derived from the full-wave rectified mains alternating voltage. The motor is not shown in FIG. 2, but consists of a three-phase induction motor with squirrel-cage rotor that is of small size and intended to be driven at high speed, in excess of 50,000 revolutions per minute, preferably in the speed range of 100,000 revolutions per minute.

To generate the motor drive frequency, an oscillator (24) is arranged, which is of the ordinary 555 type. The oscillator's frequency ($F_{osc}$) is determined by a combination of resistors $R_3$, $R_4$ and $R_5$, together with a capacitor ($C_o$). The frequency is to a certain extent adjustable using resistor $R_5$, which is a potentiometer. The output frequency ($F_{osc}$) from the oscillator (24) is led to a frequency divider (25) of type 74175, which is made with six outputs on which six pulse trains with a suitable time displacement occur. The outputs from the frequency divider (25) are connected in pairs to respective timer circuits (26, 27 and 28) of type 556. The timer circuits are made so that when one input receives a high potential they provide a corresponding high level on a corresponding output and this high level lasts for a certain fixed time which is determined by the timer itself. But the time between subsequent high level states at the output can vary depending on the oscillator frequency. In the coupling shown the timer circuit (26) has two outputs for pulse series $H_{in1}$ and $H_{in2}$ and, finally, timer circuit (28) two outputs for pulse trains $L_{in2}$ and $L_{in3}$. These six pulse series, $H_{in1}$–$L_{in3}$, are conducted to corresponding inputs on a drive circuit (29) of type 2130, which is arranged to amplify the input signals and in a corresponding way, six outputs provide the control pulses $H_1$, $H_2$, $H_3$; $L_1$, $L_2$, $L_3$ for controlling corresponding switch transistors $TR_{1H}$, $TR_{2H}$, $TR_{3H}$; $TR_{1L}$, $TR_{2L}$, $TR_{3L}$. The pulse trains or input signals to the drive circuit (29) ($H_{in1}$–$L_{in3}$) are not shown in the diagram, while the output signals from the drive circuit (29) are shown in FIG. 3 and FIG. 4 in which the oscillator output frequency ($F_{osc}$) is also shown.

Figure 5:
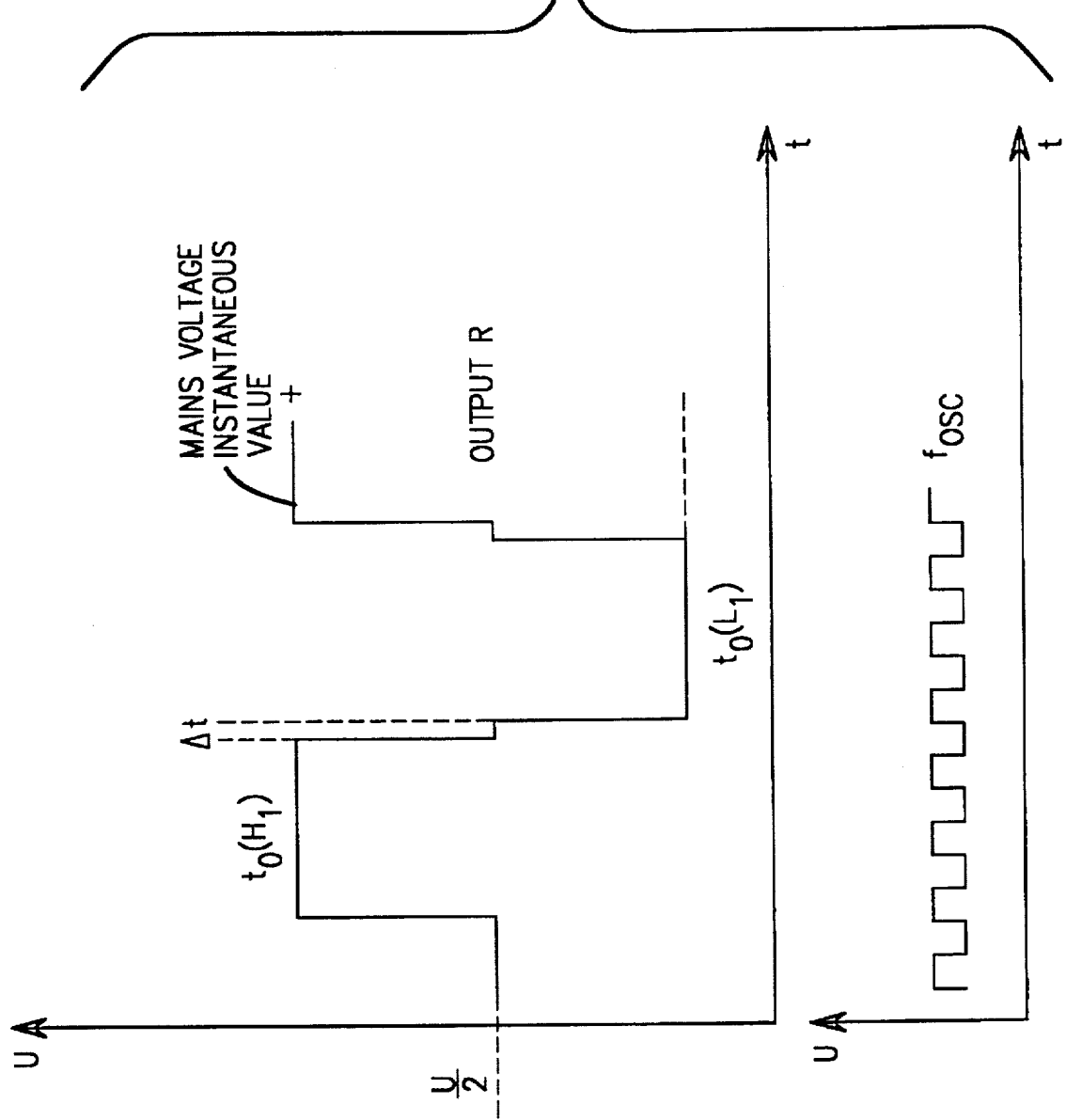
FIG. 5 is a diagram which shows the wave form for a drive voltage supplied to a motor phase

The switch transistors ($TR_{1H}$–$TR_{3L}$) are connected in pairs in series with one another between one conductor (30), connected to the full-wave rectified mains alternating voltage (U), and a conductor (31) connected to the common reference potential (neutral, live or earth). FIG. 5 shows the drive voltage at the terminal R and the corresponding case applies to the drive voltages at terminals S and T. These drive voltages are displaced in time in relation to one another so that the connected induction motor is driven in a three-phase way. The drive voltage shown in FIG. 5 at output R varies positively and negatively around an imaginary reference potential (U/2) which is midway between the feed voltage (U) and the reference potential (0 V).

Figure 3:
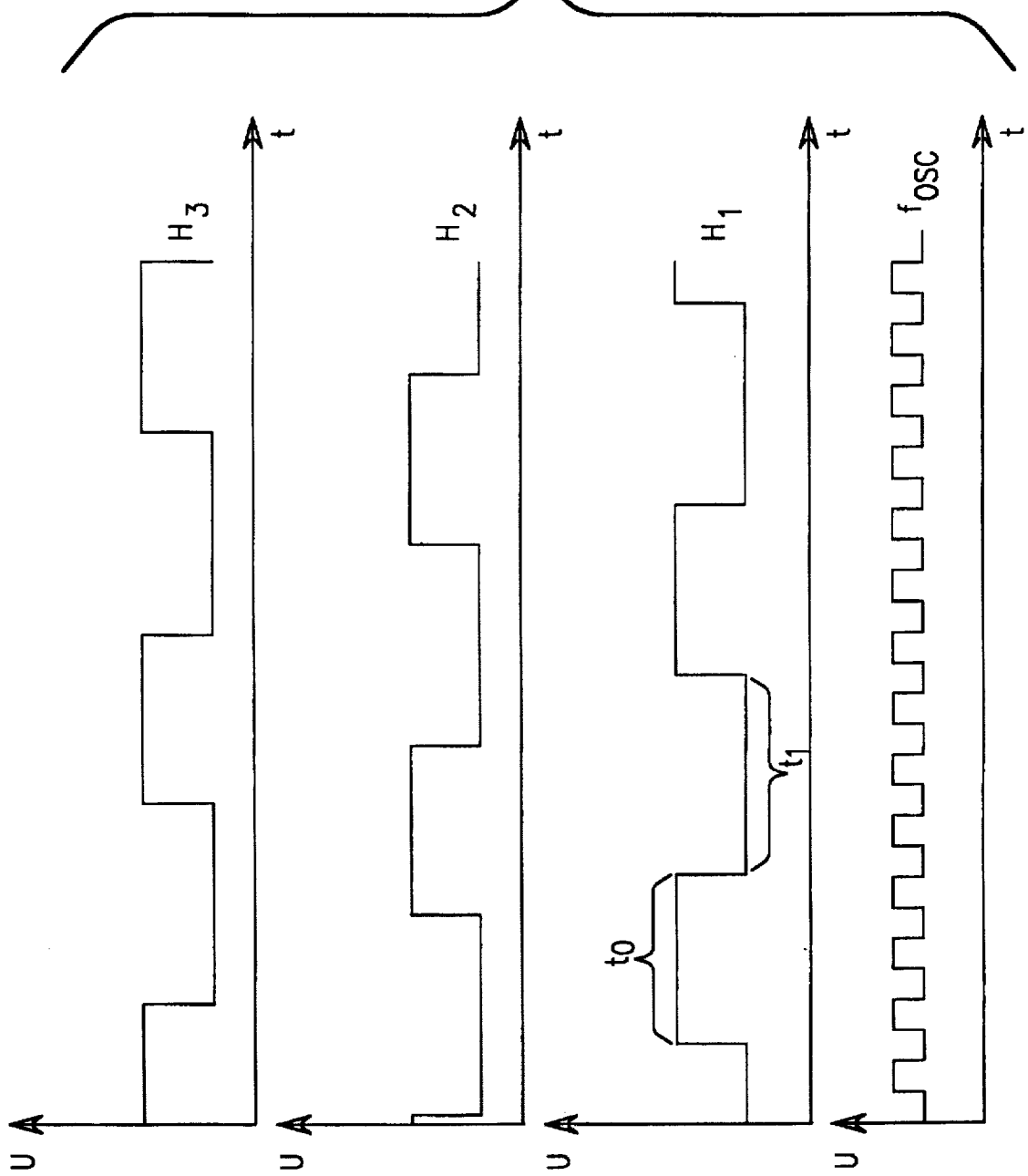
FIG. 3 is a diagram which shows the wave forms, for certain drive pulses in the coupling in accordance with FIG. 2, necessary to control the motor.
Figure 4:
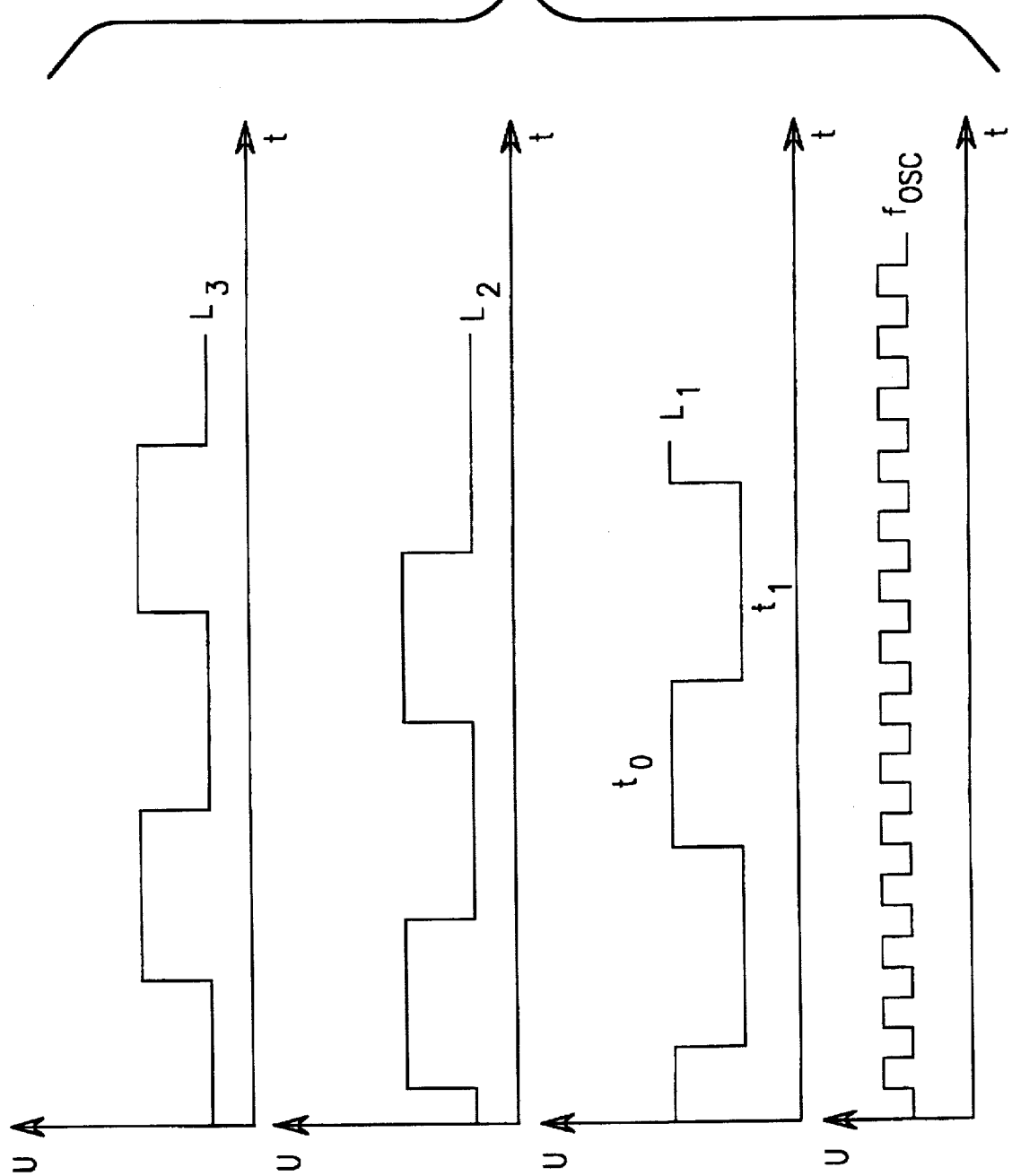
FIG. 4 is a diagram which shows the wave forms for drive pulses that complement the drive pulses shown in FIG. 3.

As shown in the diagrams in FIGS. 3 and 4, the high levels in the pulse trains have a duration $t_0$, which is fixed and determined by respective timer circuits (26, 27 and 28). But the low level periods that separate the high level periods, on the other hand, have a duration $t_1$, which can vary. The variation has two components, one of which is determined by the oscillator frequency ($F_{osc}$) set using potentiometer ($R_4$). The second component is a variation in oscillator frequency to be achieved by modulating the same with a voltage derived from the full-wave rectified mains alternating voltage. The aim of this modulation is to take into account the fact that the motor is fed with unsmoothed voltage, which implies that the amplitude is not constant but varies. By performing modulation so that the oscillator frequency increases when the amplitude of the full-wave rectified mains alternating voltage increases it is possibly to reduce the tendency of the motor to change speed in step with the variations in mains alternating voltage. With reference to the diagrams in FIGS. 3 and 4, this may be expressed by the time ($t_1$) decreasing when the amplitude of the voltage mentioned increases. In this way it is possible to achieve less and more constant slippage of the motor despite the variations mentioned in the supply voltage. With reduced slippage, the motor losses drop and thereby the efficiency of the motor improves. As shown in FIG. 2, the oscillator (24) is made with a special input (32) which, via a resistor ($R_2$) can be connected to a point where the full-wave rectified mains alternating voltage occurs, such as a point corresponding to the point M in FIG. 1.

The effect of the modulation of the oscillator frequency on the method described is also shown in FIG. 5, where it is possible to see that the voltage at the terminal R consists of a positive and a negative square-shaped half period. Each half period consists of a first part of the duration $t_0$, which is fixed. Then follows a time, $\Delta t$, which is determined by the oscillator frequency, but is also dependent on the modulation performed in the oscillator (24). It should be emphasized that the drive circuit (29) is designed so that it prevents the two transistors in each pair, e.g. $TR_{1H}$, $TR_{1L}$, being able to conduct at the same time and thereby cause short-circuiting, with consequential damage to the transistors and other components.

Certain supply voltages have been specified in FIG. 2, such as +5 V and +15 V. These voltages are generated in the normal way using a power supply unit, such as that indicated in FIG. 1.

Even if the invention provides special advantages in conjunction with high-speed induction motors of small sizes it is not limited to such motors, but can to advantage be applied in conjunction with induction motors for other purposes, such as washing machines, in which the speed is in a lower range and the load varies widely and is heavy.

The invention has been described in conjunction with an example in which a control device was built up using logical circuits of standard type. Obviously the control device can within the framework of the invention also be realized using a microprocessor with associated memory circuits, clock-pulse generators and the like. The way in which the control device works is determined in this case by the software developed for the microprocessor.

I claim:

1. A method of controlling a three-phase induction motor driven by an inverter supplied with full-wave rectified mains alternating voltage to provide the respective phases (R, S, T) of the motor with drive voltages consisting of mainly square-shaped, in relation to a virtual zero reference level, positive and negative half periods which alternate at a fixed or adjustable drive frequency corresponding to the required speed, said method comprising the steps of:

providing a signal ($U_M$) which represents the variations in amplitude in the full-wave rectified mains alternating voltage, and modulating said drive frequency with said signal ($U_M$), said drive frequency increasing as said full wave rectified voltage increases, said drive frequency decreasing as said full wave rectified voltage decreases, the slippage losses in the motor thereby being minimized.

2. A method in accordance with claim 1, further comprising the step of generating the drive frequency by a voltage-controlled oscillator (15; 25) controlled by a voltage ($U_M$) which represents the full-wave rectified mains voltage (U).

3. A method in accordance with claim 2, further comprising the step of arranging the positive and negative half periods of the drive voltage to be composed of a first part with a fixed pulse duration ($t_0$) and a subsequent second part the duration ($\Delta t$) of which varies so that it diminishes as the instantaneous amplitude of the full-wave rectified mains voltage (U) increases, and so that the duration ($\Delta t$) increases as the instantaneous amplitude of the full-wave rectified mains voltage decreases.

4. A device for controlling a three-phase induction motor, comprising an inverter, rectifying means connected to a mains AC network and supplying a full-wave rectified unsmoothed alternating voltage (U) to the inverter, said inverter providing to the respective phases (R, S, T) of the motor drive voltages which are mutually phase displaced 120° and consist of mainly square-shaped, in relation to a virtual zero reference level, positive and negative half periods which alternate at a fixed or variable drive frequency corresponding to the required speed, wherein the full-wave rectified mains alternating voltage (U) supplied to the inverter is also supplied to the respective motor phase (R, S, T) via an electronic switch coupling ($TR_{1H}$, $TR_{1L}$; $TR_{2H}$, $TR_{2L}$; $TR_{3H}$, $TR_{3L}$) the on and off periods of which, respectively, being determined by the drive frequency which is generated by an oscillator device (15; 25), said oscillator device having an input on which is applied a voltage ($U_M$) which represents the rectified mains alternating voltage (U), said voltage ($U_M$) applied to the oscillator device operating as a modulating signal superimposing on the drive frequency a signal representing said variations in amplitude of the rectified mains alternating voltage, said drive frequency increasing as said full wave rectified voltage increases, said drive frequency decreasing as said full wave rectified voltage decreases, the slippage losses in the motor thereby being minimized.

5. A device in accordance with claim 4, wherein the positive and negative half periods of the drive voltage are composed of a first part of a fixed pulse duration ($t_0$) and a subsequent second part ($\Delta t$) the duration of which varies so that it diminishes as the instantaneous amplitude of the full-wave rectified mains voltage (U) increases and so that the duration ($\Delta t$) increases as the instantaneous amplitude of the full-wave rectified mains voltage (U) decreases.

6. A device in accordance with claim 5, wherein the pulse duration of the positive and negative half periods are determined by a timer circuit (26, 27, 28, 29) adapted to provide positive square shaped pulses ($H_1$, $H_2$, $H_3$, $L_1$, $L_2$, $L_3$) which have a frequency determined by the oscillator device and a duration ($t_0$) determined by the timer and which are separated by time periods ($t_1$) the duration of which varies with the instantaneous amplitude of the full-wave rectified mains alternating voltage (U).

7. A device in accordance with claim 6, wherein the motor speed is adjustable by adjustment of the oscillator output frequency ($F_{osc}$), the duration of the time periods ($t_1$) that separate the positive square-shaped pulses also being dependent on the oscillator frequency ($F_{osc}$) thus adjusted.

8. A device in accordance with any of claims 4–7, wherein the oscillator device consists of a voltage controlled oscillator (24) which has one input (32) connected to the full-wave rectified mains alternating voltage (U).

9. A device in accordance with claim 8, wherein the oscillator (24) has an output connected to a frequency divider (25) adapted to generate six square-shaped signals with a period time corresponding to the drive frequency.

10. A device in accordance with claim 4, wherein the switch couplings for respective motor phase (R) comprise two transistors ($TR_{1H}$, $TR_{1L}$), connected in series, the connection point between the transistors being connected to the respective motor phase and the transistors being arranged so as, during the positive half period, to create a current path from a connection (30) for the rectified mains alternating voltage (U) to the motor phase (R) and during the negative half period create a current flow path from the motor phase (R) to a connection (31) with a common reference potential.

11. A device in accordance with claim 10, wherein the frequency divider (25) has six outputs connected to three timer circuits (26, 27 and 28) adapted to generate three signal pairs ($H_{in1}$, $L_{in1}$; $H_{in2}$, $L_{in2}$; $H_{in3}$, $L_{in3}$) which, via a drive circuit (29) are supplied to the respective pair of transistors ($TR_{1H}$, $TR_{1L}$; $TR_{2H}$, $TR_{2L}$; $TR_{3H}$, $TR_{3L}$) for controlling the supply of current to the respective motor phase (R, S, T).

12. A device in accordance with claim 11, wherein the drive circuit (29) is designed so that simultaneous connection of the two transistors in each pair of transistors ($TR_{1H}$, $TR_{1L}$; $TR_{2H}$, $TR_{2L}$; $TR_{3H}$, $TR_{3L}$) is prevented.

* * * * *

UNITED STATES PATENT AND TRADEMARK OFFICE
CERTIFICATE OF CORRECTION

PATENT NO.   : 5,734,250
DATED        : March 31, 1998
INVENTOR(S)  : Lindmark

It is certified that error appears in the above-identified patent and that said Letters Patent is hereby corrected as shown below:

Column 2, line 7, delete "grid" and insert --mains--.

Column 2, line 34, delete "gluing" and insert --giving--.

Column 2, after line 36, insert the centered title
     --BRIEF DESCRIPTION OF THE DRAWINGS--.

Column 4, line 10, delete "series" and insert --trains--.

Signed and Sealed this

Eighteenth Day of August, 1998

Attest:

BRUCE LEHMAN

*Attesting Officer*         *Commissioner of Patents and Trademarks*